United States Patent
Rainbolt et al.

(10) Patent No.: US 11,654,363 B1
(45) Date of Patent: May 23, 2023

(54) INTERACTION MANAGEMENT FOR VIRTUAL ENVIRONMENTS

(71) Applicant: Amazon Technologies, Inc., Reno, NV (US)

(72) Inventors: Joshua Rainbolt, Federal Way, WA (US); Bradley Aaron Rebh, Kenmore, WA (US); Hsiu Quen Cheah, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 475 days.

(21) Appl. No.: 16/049,145

(22) Filed: Jul. 30, 2018

(51) Int. Cl.
*A63F 13/67* (2014.01)
*A63F 13/90* (2014.01)

(52) U.S. Cl.
CPC .............. *A63F 13/67* (2014.09); *A63F 13/90* (2014.09)

(58) Field of Classification Search
None
See application file for complete search history.

(56) References Cited

U.S. PATENT DOCUMENTS

| | | | | |
|---|---|---|---|---|
| 4,600,200 A | * | 7/1986 | Oka | A63F 13/10 463/33 |
| 6,283,861 B1 | * | 9/2001 | Kawai | A63F 13/10 463/43 |
| 7,281,982 B2 | * | 10/2007 | Aonuma | A63F 13/10 463/32 |
| 9,901,821 B2 | * | 2/2018 | Matsui | A63F 13/2145 |
| 2012/0309480 A1 | * | 12/2012 | Kashitani | A63F 13/45 463/8 |
| 2016/0267799 A1 | * | 9/2016 | Terzian | G09B 5/02 |

* cited by examiner

*Primary Examiner* — Omkar A Deodhar
(74) *Attorney, Agent, or Firm* — Hogan Lovells US LLP

(57) ABSTRACT

A design platform facilitates development and management of interactions and events involving objects in a virtual environment, such as a gaming environment. Each object, or type of object, can have one or more tags applied. The tags are used to determine a rule to enforce when an event occurs with respect to an object, or the object interacts with another object in the environment. This can include, for example, determining an animation, sound, or action to trigger for the object. A set of rules can be defined, where each rule is associated with a set of tags. A custom expression can provide logic to be evaluated to determine which rule to apply for an interaction, where the script can specify certain tags, or groups or tags, that must be present, or not present, for the rule to apply. The tags for a given object can be updated dynamically during gameplay.

20 Claims, 9 Drawing Sheets

Rule 1: action - pass through with no collision
tags – (a) ghost, NOT human, (b) wall Rule 2: action – collision, collision animation, collision sound
tags – (a) human, (b) wall

INTERACTION MANAGEMENT FOR VIRTUAL ENVIRONMENTS

BACKGROUND

As computing technology continues to improve, the complexity of applications available for various computing platforms increases accordingly. For applications such as video games, this can include very large, complex worlds with many different characters, objects, and environments. In order to provide a realistic gameplay experience, at least some of these various objects should interact in realistic ways with each other, as well as with player characters and other gameplay elements. Interactions are often specified by applying a single type of interaction to a specific object. For large numbers of items and types of interactions, this can be very complex to manage. Further, changes in gameplay or interaction typically involve manually updating the interactions associated with the individual objects. This can be very time consuming and provides many opportunities for error on the part of the developer.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the development and execution of electronic gaming applications. In particular, various approaches provide for the management of interactions between objects, and other such events, in a virtual environment, such as a gaming or artificial reality environment. Each object, or type of object, added to a gaming application can have one or more tags applied. The tags can be used to determine an interaction rule to be enforced when that object interacts with another object in the environment, or an event rule to be enforced for the occurrence of a type of event in the environment, etc. This can include, for example, determining an animation, sound, or action to trigger for the event or interaction. A set of rules can be defined for an interaction, for example, where each rule is associated with a set of tags to be associated with the objects for the interaction. A custom expression can also be used to provide script or logic to be evaluated to determine which rule to apply for an interaction, where the script can specify certain tags, or groups or tags, that must be present or not present for the interaction rule to apply. The tags for a given object can also be updated dynamically during gameplay, or at runtime, which can cause different interaction rules to apply to that object. The rules, tags, and expressions can be saved and used for other objects in the same game, or for other games with at least somewhat similar gameplay or overlapping interaction types.

Various other functions can be implemented within the various embodiments as well as discussed and suggested elsewhere herein.

Figure 1A:
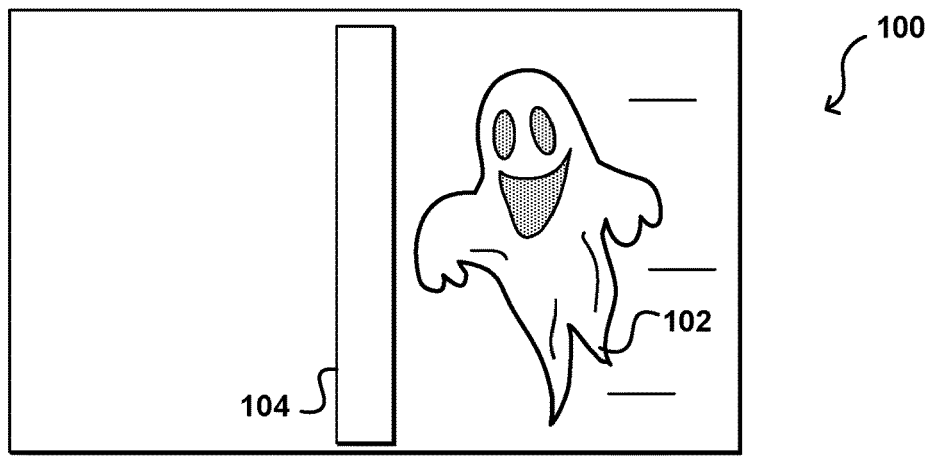
FIGS. 1A, 1B, and 1C illustrate example interactions between two elements of a computer game that can be provided in accordance with various embodiments.
Figure 1B:
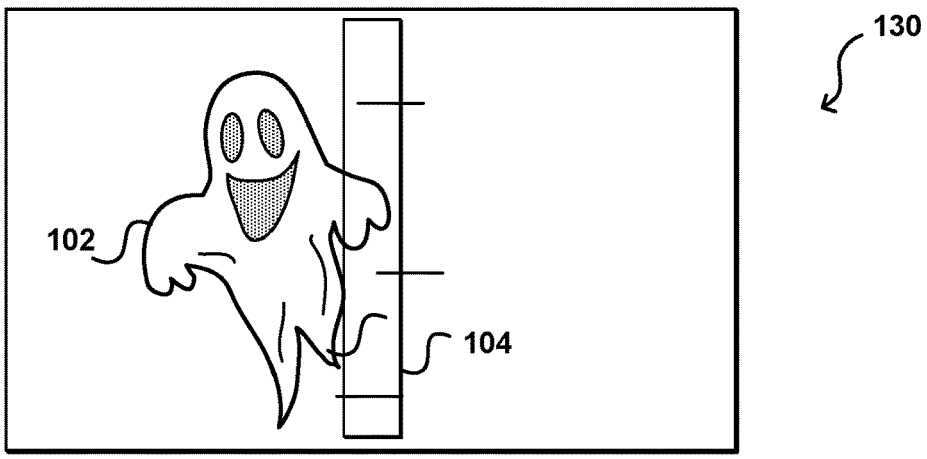
Figure 1C:
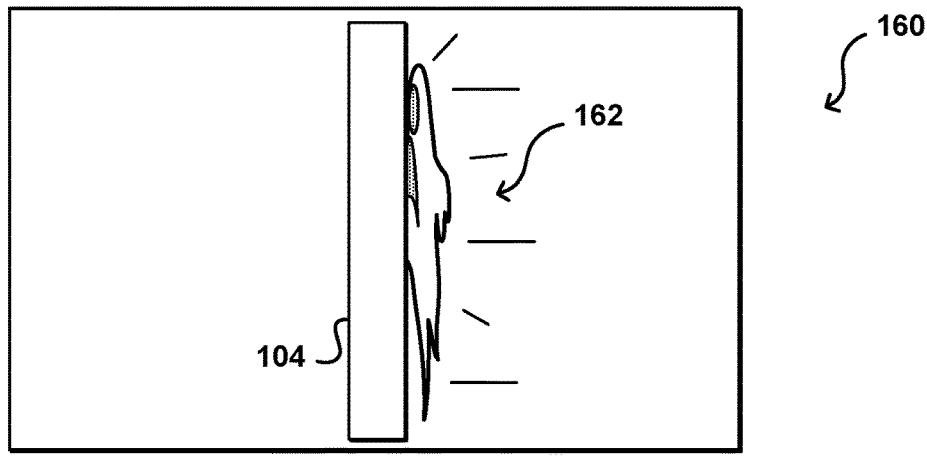

As mentioned, for a computer application such as a video game there may be various interactions that are to be managed for the game. FIGS. 1A through 1C illustrate example interactions that can be provided through such a video game. In the example gameplay view 100 of FIG. 1A, there is a player character 102 represented by a rendering of a ghost. The ghost is being moved from right to left in the plane of the figure, towards a wall 104. As the ghost continues to move towards the wall, at some point a portion of the ghost will come into contact with a portion of the wall. This may involve, for example, at least one pixel used to render the ghost being adjacent to, or at the same display position as, at least one pixel used to render the wall. The interaction may also involve a bounding box, hit box, object mesh, or other boundary or aspect associated with the ghost coming into contact with a similar boundary or aspect for the wall, among other such options.

The movement of the ghost to one of these positions or state can trigger at least one type of interaction. The interaction can include various types of actions, as may relate to a specific animation, a change in movement or position of at least one of the elements, the generation of a specific sound, the providing of haptic feedback, or other such actions. It might be the case that the type of interaction to be triggered depends at least in part upon the state of at least one of the gameplay elements that is interacting. As an example, if the gameplay element 102 corresponding to the ghost is in a default ghost state, then the ghost character may be able to pass through the wall 104 as illustrated in the gameplay view 130 of FIG. 1B. There may be an animation or sound triggered, for example, but the ghost is able to pass through the wall. It might be the case, however, where the ghost is in a frozen state or has possessed a physical object. If that is the case, the ghost may not be able to pass through the wall and instead might have an interaction corresponding to a collision with the wall 104, as illustrated in the gameplay view 160 of FIG. 1C. It might also be the case that the ghost has not changed state but the wall 104 has changed state to a type of wall, or is just a type of object, through which ghosts cannot pass. Such an interaction might still be triggered as in FIG. 1C, but due to the state of the wall instead of the ghost. As illustrated, there might be an animation 162, sound, haptic feedback, or other such actions triggered as a result of the type of interaction to be performed. The interaction or event might also impact how the action is performed, in addition to the fact that the action is to be performed. For example, there might be a physical trigger on the ground, which when activated causes the ground to change state to something that has different rules, such as where the ground is now water, a cloud, or a row of jewels instead of ground, and the new state might be associated with different tags and/or rules. The change in state could thus be the result of a physical trigger performed by a player to the game, rather than an event trigger in the game.

As mentioned, interactions such as physics-based collisions in many conventional games are based upon one-to-one relationships of actions to specific objects. In some embodiments the actions can be represented by tags that are attached to an object. A "tag" as referred to herein can include any data or metadata that is associated with an element of a game, that can be used to determine or define some aspect or, or relating to, that element. This can include an entry in a table for the element, metadata stored with the element, etc. The tag may be one of a set of tags defined or provided for a game, in order to provide for simplified management of the game, wherein similar objects or elements can have the same tags, or types of tags, applied, which can help to also provide for more consistent gameplay if the same types of objects or elements have the same types of interactions associated with them. As mentioned, however, having to manually set, track, and update single tags for the various objects can be cumbersome and can provide many potential opportunities for human error.

Accordingly, approaches in accordance with various embodiments provide a mechanism for managing interactions, as well as various other event occurrences, through a set of custom tags and corresponding rules. Such an approach allows for unique variations between objects or elements in a computer game or other virtual environment, including augmented and virtual reality environments, computer animation, and the like. Such an approach also enables developers and designers to store and share custom rules and tags, as well as enabling them to create custom expressions. In some embodiments, the tags and rules can be used together to determine the physics of a game. The real-time physics enabled by the gaming engine determines how objects in a game move, interact, and react to the virtual environment, including other objects and gameplay elements. Properly designed and implemented, the physics can help the elements of the game to function in a more realistic way, or as would be expected of those types of elements. A strong sense of realism can help to make the gameplay experience more immersive for the players.

One type of interaction that can benefit from such an approach is a collision action. There can be many actions involved in a collision of two or more gameplay elements, which can depend at least in part upon the types or states of those elements. As mentioned, there can be animations, changes in motion or position, sound generations, haptic feedback, and the like. In some conventional gaming approaches, two gameplay elements can only collide with each other by naming those elements as part of a specific group, which is associated with a specific type of interaction. A better approach is to be able to set different collision actions for multiple items, individually or as a group, and to associate the functionality on the elements or groups in a simplified manner. Certain game engines, such as Unreal or PhysX, can enable a developer to determine which elements collide with which other things using the individual tagging or grouping approach. Such approaches require the development and maintenance of a large number of relationships, often maintained through a large table of entities that are able to interact or collide.

Figure 2A:
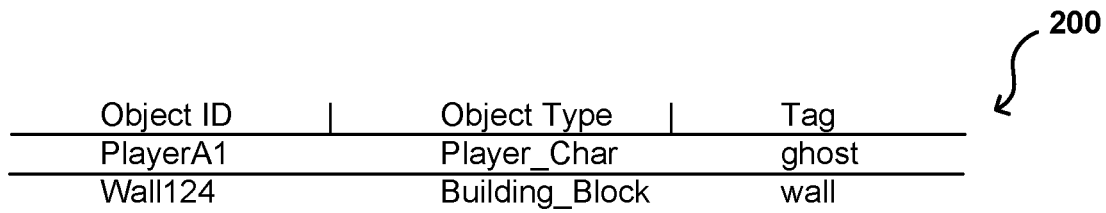
FIGS. 2A, 2B, and 2C illustrate example gameplay element tag selections and rules that can be determined for player position in accordance with various embodiments.
Figure 2B:
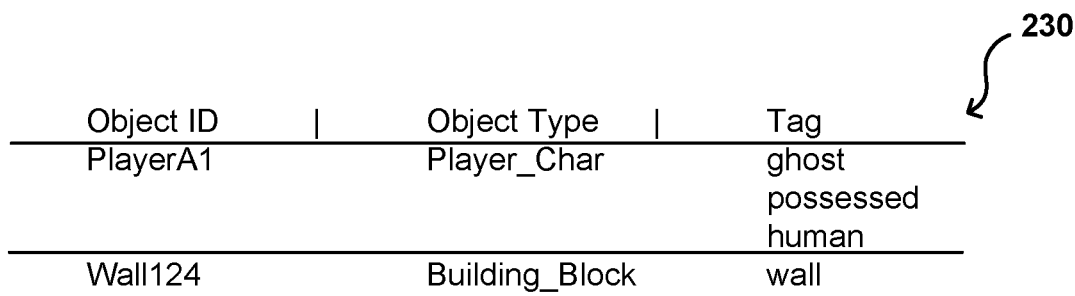
Figure 2C:
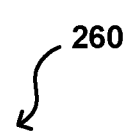

Approaches in accordance with various embodiments provide a universal tagging and filtering system that enables developers and designers to specify any kind of relationship between two or more gameplay elements, whether it relates to a physics collision, an animation, a sound generation, etc. FIGS. 2A through 2C illustrate a logical example of how tags and rules can be used to define custom interactions of various gameplay elements. In the tag view 200 of FIG. 2A, a developer can apply tags to individual objects, types or objects, or groups of objects. In this example, a player character has the tag "ghost" applied. This will cause the interaction of the player character with another gameplay element to be determined by one or more rules associated with the tag "ghost." In this example, which relates to the situation of FIG. 1A, the building block object associated with the wall has a "wall" tag. In order to determine the type(s) of interaction of these two elements, the game engine can utilize the "ghost" and "wall" tag to determine the appropriate interaction rule, and execute the associated action(s). As mentioned, however, there may be some situations where a different interaction is desired for those two types of elements. In order to provide such customization of interactions, there can be multiple tags applied to individual objects, types of objects, or groups of objects, and these tags can be changed dynamically during gameplay. For example, the ghost might possess a human during gameplay, which might cause the ghost to interact with objects more like a physical being. As illustrated in the tag view 230 of FIG. 2B, the tags for the player character have been updated to include "possessed" and "human" as well as "ghost." This can indicate that in its current state, the element is still a ghost but the ghost has possessed another type of element, and in this case the element possessed is a human. Thus, the interactions of the ghost with elements might be closer to that of a human where it can only pass through objects that a human could pass through, may not be able to fly, etc. Various tags and rules can also be modified, activated, or deactivated during runtime, such as may be used to test various changes or to allow for various changes in gameplay, etc. For example, a game editor can make a change in a rule or tag to cause a corresponding action to change, in order to determine the result in a runtime setting. A game manager might also be able to change the applicable rules dynamically in order to modify various aspects of the game with little effort required.

In order to achieve the desired functionality, however, the system can utilize one or more custom rules that can determine the interaction based at least in part on the applied tags. FIG. 2C illustrates simplified rules 260 that indicate logic that can be applied. As would be apparent to one of ordinary skill in the art, the rules would actually be coded or written in a language and format that can be executed by the respective game engine or application. In order to provide the behavior discussed above, a first rule indicates that a gameplay element can pass through another element with no collision, if those two elements have the ghost tag and the wall tag, and also do not have the human tag. In this example, the tag "possessed" may not be included in the rule because a ghost might be able to possess another ghost or object that can also pass through without collision, so here the ghost will only not be able to pass through a wall if also in some type of human form with the human tag applied. If the ghost has the "human" tag applied then a second rule would govern the interaction, which indicates that for the tags "human" and "wall" there should be a physical collision. This rule would then hold not only for ghosts who have possessed humans, but also humans themselves. Such an approach can easily enable ghosts having possessed humans to act similarly to humans, because they would both have the "human" tag applied, and would have the same interaction rule. If the rule is changed to impact how humans interact with a wall or other object, the nature of the tag and rule system would cause this to automatically be applied to ghosts who have possessed humans as well.

In another example, a gameplay character might be in a team water balloon match, all team characters would need to be tagged as a person, which can collide with objects or projectiles. If a water balloon is thrown by a teammate, it might collide with the player on the opposing team, but also collide with the gameplay character nearby as they are both tagged with the person tag. It can be difficult, from a game logic perspective, to distinguish between the characters without some way to distinguish how the interactions should differ. There may be base tags, which can correspond to everything or nothing. So if a base tag is applied to an object, then by default that object will collide with all other elements in the game with a similar tag, or will not interact with any elements. The ground might have an "everything" tag applied, where all objects collide with, and do not pass through, the ground, while a cloud element might have a "nothing" tag applied as it may not collide with anything, which can then be specified by the corresponding rule.

In order to allow for more complex interactions and behaviors, however, custom tags can be generated and applied dynamically during gameplay, in order to cause the appropriate interaction rule to be applied. Such an approach enables a general rule to be applied to a gameplay element, which can then cause specific rules to be applied for that element. The interface enables these rules to be maintained in one place versus all over the game engine, and helps to update things in tandem across the game engine overall.

Figure 3A:
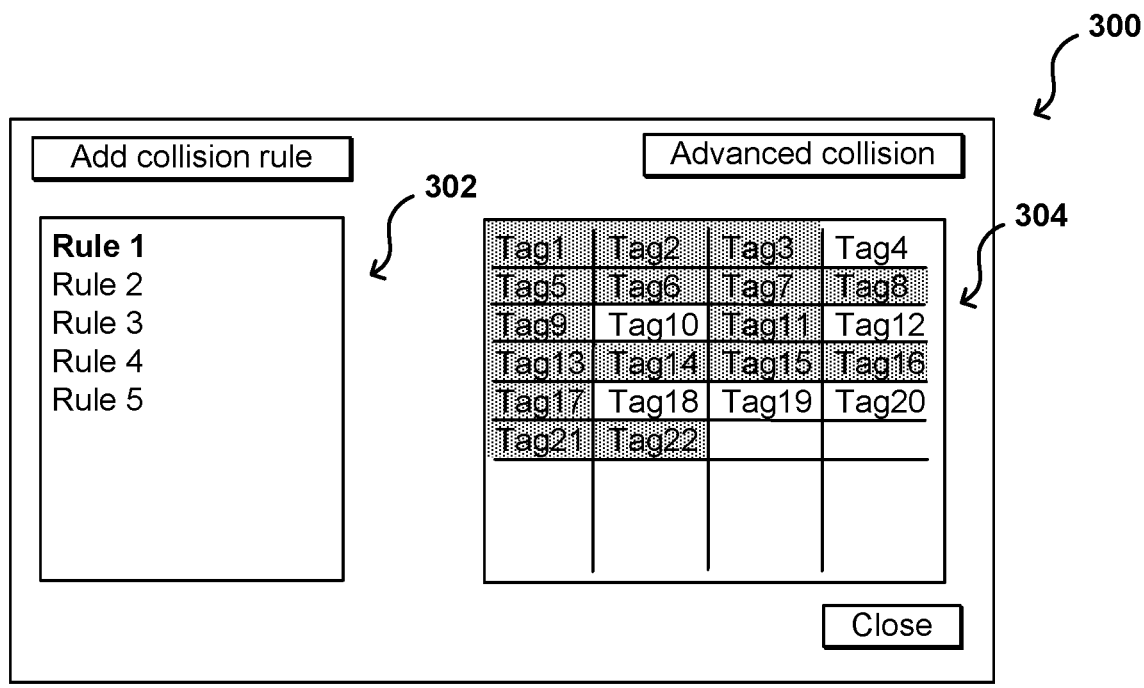
FIGS. 3A and 3B illustrate views of an example interface that can be used to manage interactions in an electronic environment that can be utilized in accordance with various embodiments.
Figure 3B:
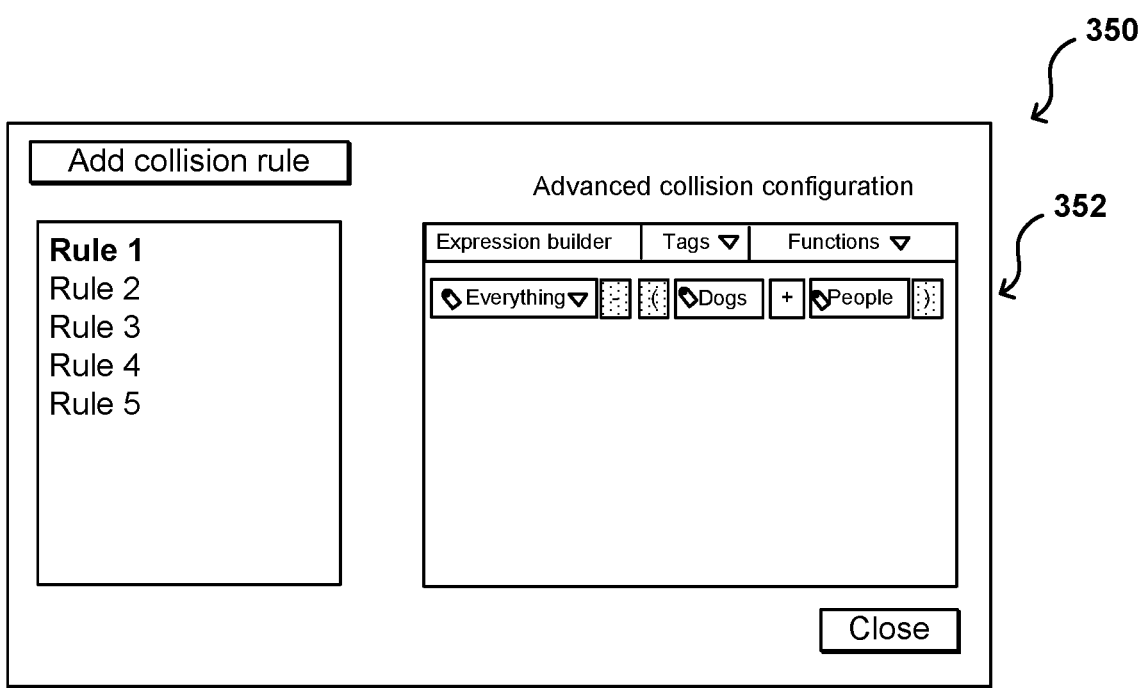

FIGS. 3A and 3B illustrate views of one such interface that can be utilized in accordance with various embodiments. In the view 300 of FIG. 3A, a developer can specify all tags for which a particular rule applies. This might be a water balloon collision, for example, wherein a splash sound will be played, a splash animation rendered, and an appearance of a gameplay element changes as part of the collision interaction. The developer can then select all tags for which such an interaction should occur. This might include tags for player characters, non-player characters, animals, buildings, automobiles, and the like. As illustrated, a developer can select a rule 302 then quickly select all tags 304 for which the interaction rule is to apply, or deselect any for which the rule is not to apply. In some embodiments such a collision matrix can be stored such that a similar selection of tags can be loaded and applied for another type of interaction, or a similar action in a different game. If a new item is introduced to the game, such as a paint roller or silly string, the same rule can be reused and applied to the new item to define the type of collision, although a custom rule might indicate a different animation or sound to generate, amount of health to add or remove, etc.

In the view 350 of FIG. 3B, the developer can create custom interaction rules and expressions that can help to achieve the desired game behavior. For example, a goal of a game might be to get puppies adopted by player characters in the game. Various interactions may then be different for characters and dogs where there has already been an adoption. Thus, in this custom expression 352 the expression is everything by default, but excludes elements where dogs and people are tagged together as a group. As an example, the game might involve a cupid-type interaction where the player attempts to match pets and people, and gets them to fall for each other. If the player targets a person who already has a pet, then there will be no such collision or interaction. As should be apparent, such an expression could easily be modified to enable the same behavior to apply for other types of pets as well, such as to add tags for cats or hamsters to the expression. Thus, the rule might define the interaction and the tags can determine the relevant elements for the interaction to apply, but the custom expressions can be used to provide logic into when certain rules should or should not apply even though one or more relevant tags are associated with a respective gameplay element. Rule 1 would define the interaction to be applied for a collision with a dog or a person, but would not apply if the dog and the person are grouped together per the expression.

As mentioned, tags can be applied, removed, or updated dynamically for various elements during gameplay. The changing of tags can cause different rules to apply, and the expressions can provide another layer of logic to provide circumstances where certain rules that would otherwise apply should not, or vice versa. An option such as an advance collision configurator enables the developer to start generating script of the rules should be or when they should apply. Such an approach also enables the interaction to apply to a specific group, or not apply to a specific group of elements, without having to define a specific group and manually apply a tag for that group to each relevant gameplay element. And when a new character is introduced into the game, a tag such as "person" can be applied such that all the appropriate rules and expressions will automatically be applied and enforced.

In one embodiment a rules system enables a developer to set up the various relationships and expressions and then save that information to an asset file. The file can then be saved to a gaming repository. When a developer then wants to create a new gameplay entity, in the same game or a different game, the developer can look at a list of available rules, tags, expressions, collision matrices, etc., and can select the appropriate option if it exists. This can be from a drop-down menu or other such option. The developer can then utilize the option, or can copy and modify the option to perform the desired action. Such behavior can help for related games, such as sequels, where a set of rules, tags, behaviors, and/or expressions can be loaded which will cause the gameplay elements by default to behave as in the earlier game, which can save a significant amount of development time as only new or different behaviors need to be generated, and existing behaviors can quickly be applied to new types of gameplay elements.

As mentioned, tags can be used to define the state of an object as well, which can change the interaction rule that applies. In one example, a water character might be defined that by default behaves like water. The character might be frozen into ice, or heated into steam, which would then behave much differently. This might involve an "ice" or "steam" tag being dynamically added to the element for the appropriate time, which can then impact the interaction rule that applies. This can be handled through a set of behavior rules and expressions, where the expression might be "water" but not "ice" or "steam." Such an approach can also be thought of as a filtering system, which quickly enables the correct rule to be identified for an interaction by filtering based on the tags applied to the interacting elements.

Such an approach also helps for very large games, particularly which provide many instances of downloadable content (DLC) or player modding. For any expansion of the world, the same rules and expressions can apply. For any new elements, the developer only needs to apply the correct tags and/or select the appropriate interaction matrix in order for the expansion to behave similar to the rest of the world. If new tags are added for new types of objects or elements, those can quickly have relevant rules applied by updating the relevant interaction matrix, etc. Such an approach can also help the game to be more stable, as there is a relatively small and consistent set of rules to be applied across the entire environment. A developer can enable hundreds of entities to share the same ruleset, and can determine the application of those rules through the application of tags and customized expressions, generating relationships that are easy to manage and update. The rules and expressions can also be saved and reused as appropriate. This can be particularly beneficial for lines of games, such as for children's toys or movie franchises, where the basic mechanics of all the games are essentially the same, but with different characters and locations. The same rules and expressions can be applied, with a developer only needing to apply the correct tags or object types to the new characters or elements to have their behavior consistent with the other games in the series or set.

In some embodiments the rules and expressions can also be offered as a service or other offering that may be leveraged by multiple developers of various games. For example, a gaming platform might enable various developers to develop their own games or environments on the platform. These rules, expressions, tags, and matrices can be exposed through the interface so that they can be added to the game, or activated for the game through the platform, in order to handle many types of interactions. For example, many games will have player characters that walk on the ground, collide with walls, etc. Much of this basic behavior may be obtained simply through selecting a base set of rules and expressions that have already been developed through other games or by other developers.

In order to avoid potential conflicts with tags, or not having a matching rule due to applied tags, there can be a ranking or hierarchy of tags as well in some embodiments. For example, in the ghost example above another character might cast a spell that puts a ghost-possessed human on fire. It might be the case, however, that an entity with tags of "ghost," "human," and "fire" does not have any rule defined for that particular combination of tags. In some cases there might be a default rule that applies for all such cases. In some embodiments, there might be a primary tag, or ranking of tags, for an element, which can be used to settle conflicts or at least attempt to locate the most appropriate behavior. For example, a human tag might have a higher ranking or weighting than a ghost tag or a fire tag, because a human will have similar interactions (at least from a collision standpoint) if they are possessed or on fire. If there is a rule that applies for a human tag but none that applies to an entity with both human and fire, then according to a ranking a rule applies for the human tag but not the fire tag might be selected. Such a tag might also be configured to override one or more other tags, such as where if a human tag is applied then the human tag will override the ghost tag and rules for the human tag will apply and be enforced. There may be multiple tags that override other tags, and the tags will be analyzed to determine which tags actually should be used to determine the applicable rule(s) based on those overriding tags. A rule can take a collection of tags and make a determination as to the relevant tags based at least in part upon the game logic. Further, for certain types of events or interactions the applicable rules may be determined independent of the associated tags. In at least some embodiments the development platform may include logic that indicates to the developer when a character or element has tags applied that would cause a conflict in rules, or would result in no result being applied, such as may generate an error or notification upon saving or executing, etc.

As mentioned, such a model can be used anywhere in an application or virtual environment where a decision is to be made. This could include aspects of an artificial intelligence behavior tree or animation tree, rendering lighting system, etc. Elements can be tagged and associated with rules and expressions that can dictate the behavior or action to occur as a result of an interaction or other specified occurrence or state. The rules can also include scripting as to the action to take as well, such as to indicate different amounts of health adjustment for specific distances or tags, types of sound to play, etc. Once this is in the rule it can be automatically applied for any interaction with a gameplay element with the appropriate tags applied. And as mentioned, objects can be grouped together to have similar behaviors applied. For example, in the case of weapons for a game there might be one category for blade-type weapons and one for blaster-type weapons, where the two categories each have distinct behaviors that should be applied to any weapons added to the respective categories.

Figure 4A:
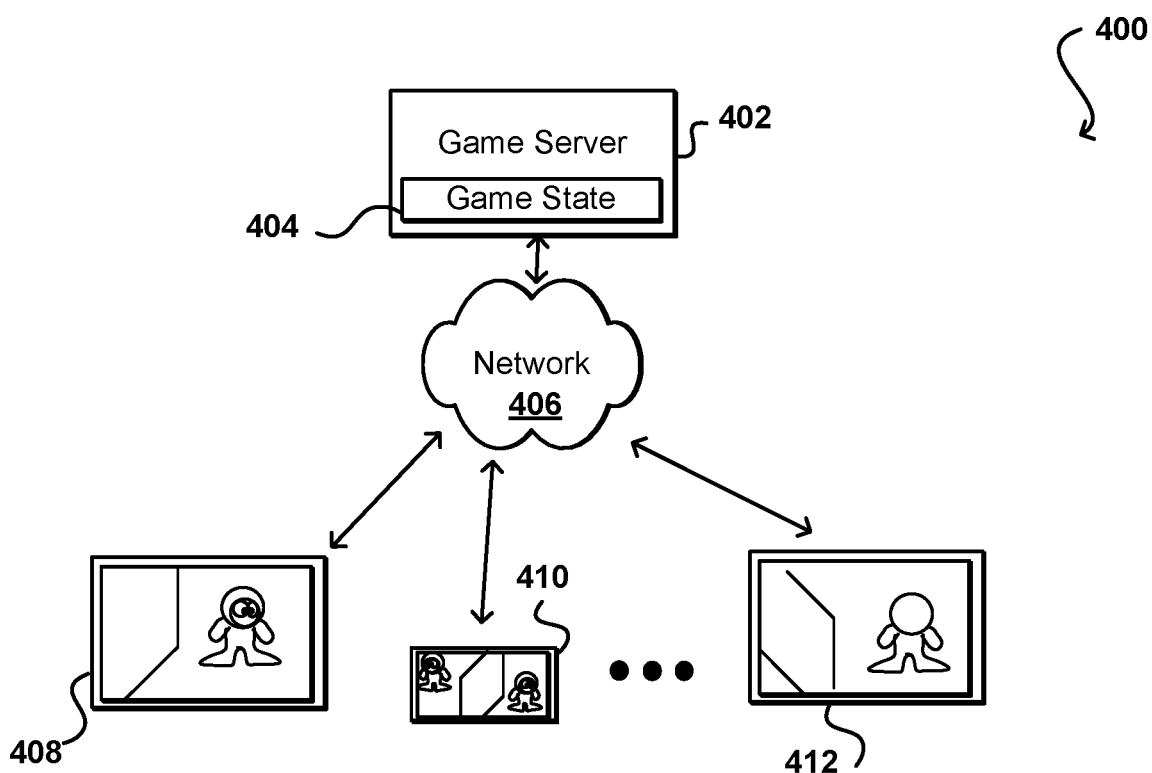
FIGS. 4A and 4B illustrate an approach to managing interactions for networked multiplayer games that can be utilized in accordance with various embodiments.

FIG. 4A illustrates an example gaming configuration 400 that can be managed in accordance with various embodiments. In this example, a gaming session is hosted on at least one game server 402. The game server 402 can be a local gaming machine or a remote server operated by a game provider, among other such options. In this example the game offers multiplayer capability, whereby multiple players can utilize respective devices 408, 410, 412 to connect to the game server 402 over at least one network 406, such as the Internet, a local area network, a dedicated gaming network, a peer-to-peer network, or a cellular network, among other such options and combinations thereof. The players can join in a session of the game with state data that is managed by a game state component 404 of the game server. In some embodiments one or more game servers 402 can execute the game, while in others the servers can manage game state for instances of the game executing on the various player devices 408, 410, 412, among other such options. These devices can include specific gaming devices, such as gaming consoles or handheld consoles, or other computing devices such as smart phones, tablet computers, wearable computers (e.g., smart glasses or watches), desktop or notebook computers, and the like. State information can be transmitted to the gaming server 402 at appropriate times, such as periodically, in response to certain actions or occurrences in the game, in response to requests from the server, or at other appropriate times. The game server can maintain the state information such that the game state is consistent across the various devices, as well as to enable a saving or restoring of the game for any or all of the devices.

In many instances, a first player will submit a request to join a session of a specified gaming application supported by the game server 402. If there is an existing game session for which the player qualifies, such as by having an appropriate skill level or qualification, then the player can be added to the existing game session. If there is no existing game session for which the player qualifies, or if games can only be joined before the session starts, then the request can trigger the initiation of a new session for the game. In some embodiments the new session can begin immediately, while in other embodiments or for specific games there might need to be a specified number, minimum number, or quorum of players for a session before the session can begin. For example, if a game requires ten players then a session might not start before ten players have joined, with the first nine players having to wait at least until a tenth player joins. In some cases additional players can join during a session, such as up to a maximum number of players in some embodiments, while in others players may not be able to join, or may only be able to join if a current player leaves the session, etc.

In many situations, the player devices will be at different geographical locations. In order to ensure that all the game state information utilized by the player devices is accurate, player input in many cases will be transmitted from the individual player devices to the relevant game server 402, such that the game state can be updated by the game state manager 404, and the updated game state information can be propagated to the various player devices such that the devices are all utilizing consistent game state information. The game state information can include, for example, position and orientation information for the players and objects in the game, as well as gameplay data for actions being performed in the game environment by any of the players or other gameplay elements. Such an approach can result in difficulty managing state for the game, however, as any instance of player data must be transmitted from the respective player device to the server, and sent back to the relevant gaming devices. Since players can have various types of network connections with differing speeds, including cellular and landline-based connections, there can be significant latency involved in getting gameplay data from one player device to another. For games such as real time, multiplayer online video games, this latency can have a meaningful, negative impact on gameplay. For example, if the game involves throwing a ball or shooting a paint gun, a first player might direct the action towards a last known location received for a target player. The action will be likely to miss, as the other player may have moved since the last received location such that the first player may see the action take place but the action will actually fail because when the game state data is synchronized the target player will actually not have been in that location. The game server then might have to retract the apparently completed action, or wait to determine whether the action is successful, either of which can significantly degrade the gaming experience.

Figure 4B:
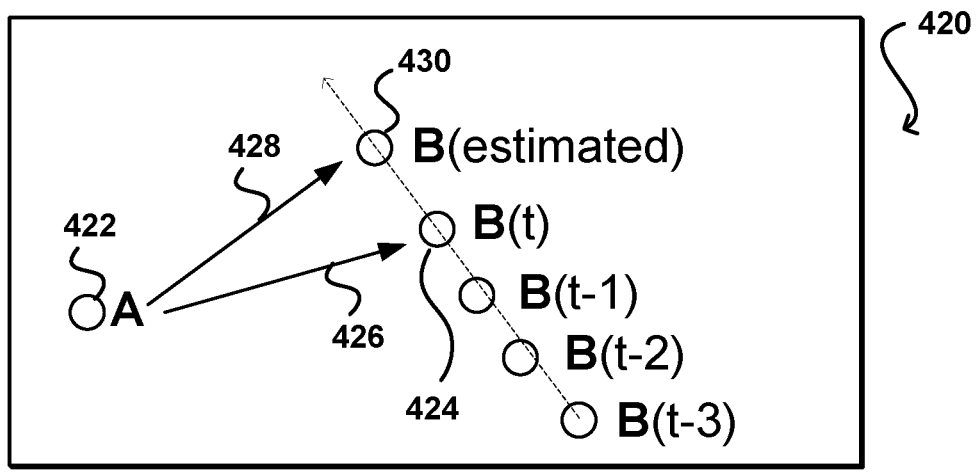

In an attempt to manage the issues with latency, many conventional gaming services implement static gameplay prediction logic. Traditionally this prediction logic is manually generated by a developer around a set of player data. In one example, the prediction can be a linear extrapolation using a player's prior positions, including a rate or type of movement. This can then be used to determine both the direction and the speed, along with other factors such as a maximum speed of a type of character and other such data. FIG. 4B illustrates results 420 of such a prediction model that can be utilized in accordance with various embodiments. In this example, a first player 422 (Player A) is at a first position in an overhead view of the gameplay location. A second player 424 (Player B) is at a second location in the overhead view. This corresponds to the last position reported for Player B as received to a device corresponding to Player A. If player A throws a ball to Player B at the last reported position 424, along a given trajectory 426, the throw would miss because at the time the ball arrives in the game Player B is at a different actual location. In order to have the game appear to be in real time, the game could use the last reported position 424 which would show that the ball was successfully delivered, but would then have a problem when the synchronized gameplay data shows the player actually moved to a current actual location. By the time the action data gets to the device of Player B, the trajectory 426 would have caused the ball to miss Player B. There would be difficulty in reconciling the two local gameplay states after the fact.

As mentioned, an approach to minimizing the latency impact, resulting in events happening at different times on different devices, involves attempting to predict the location of Player B at a near future point in time, and make determinations based on the predicted location(s) instead of the last reported location. For example, the position data in FIG. 4B shows the last reported position 424 of Player B, as well as the three prior locations with associated timestamps or time data. Based on the current location and the recent prior locations, a future prediction can be extrapolated by a fitting a linear function, curve, or exponential function, etc., to the set of recent points. This can include a time component as well in at least some embodiments. In this example, a linear extrapolation (or interpolation) is applied to the recent location points to determine a predicted future location 430 of Player B based on Player B's recent movement and information known about the game, the type of character controlled by Player B, and other such information. In this way, Player A would be determined to successfully target Player B by throwing the ball along a different trajectory 428, which would arrive at the predicted location 430 at the associated time. Such predictions can be used to determine when interactions should occur, including many of those discussed herein. In some embodiments the rules or expressions for an interaction might differ for predictions in such situations. For example, a tag might be applied to indicate that a type of interaction is low priority, where it may not matter if the game does not get it exactly right, such that a certain confidence in a prediction can be used to trigger an interaction. For other, more critical interactions, there may be little to no prediction allowed, or certain actions may be performed until an actual interaction can be determined with at least a minimum amount of certainty, etc.

Figure 5:
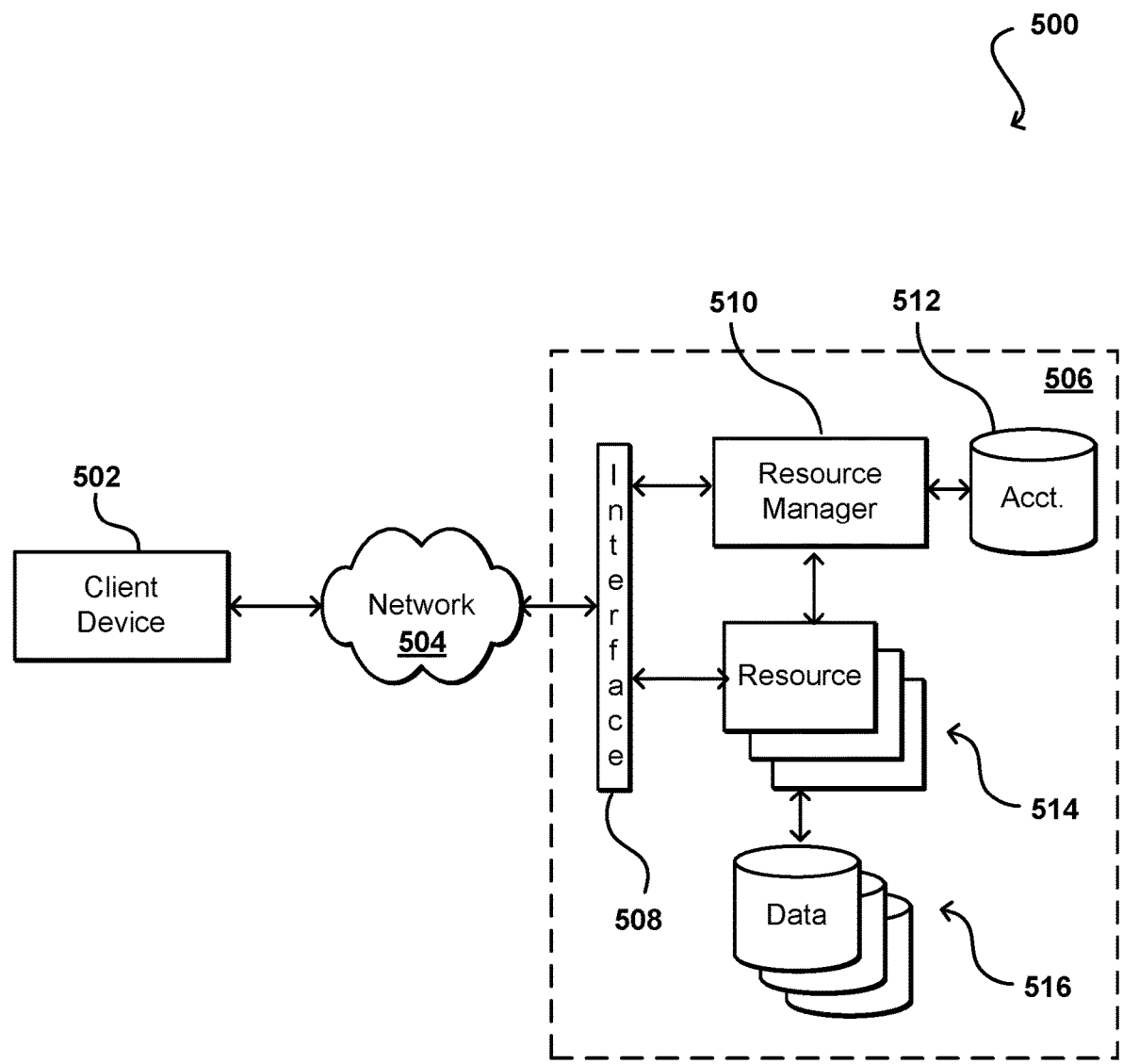
FIG. 5 illustrates an example environment in which various embodiments can be implemented.

FIG. 5 illustrates an example environment 500 in which aspects of the various embodiments can be implemented. In this example a user is able to utilize a client device 502 to submit requests across at least one network 504 to a multi-tenant resource provider environment 506. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 504 can include any appropriate network, including an intranet, the Internet, a cellular network, a local area network (LAN), or any other such network or combination, and communication over the network can be enabled via wired and/or wireless connections. The resource provider environment 506 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 514 of one or more types. These types can include, for example, application servers operable to process instructions provided by a user or database servers operable to process data stored in one or more data stores 516 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 514 can submit a request that is received to an interface layer 508 of the provider environment 506. The interface layer can include application programming interfaces (APIs) or other exposed interfaces enabling a user to submit requests to the provider environment. The interface layer 508 in this example can also include other components as well, such as at least one Web server, routing components, load balancers, and the like. When a request to provision a resource is received to the interface layer 508, information for the request can be directed to a resource manager 510 or other such system, service, or component configured to manage user accounts and information, resource provisioning and usage, and other such aspects. A resource manager 510 receiving the request can perform tasks such as to authenticate an identity of the user submitting the request, as well as to determine whether that user has an existing account with the resource provider, where the account data may be stored in at least one data store 512 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 502 to communicate with an allocated resource without having to communicate with the resource manager 510, at least until such time as a relevant aspect of the user account changes, the user is no longer granted access to the resource, or another such aspect changes.

The resource manager 510 (or another such system or service) in this example can also function as a virtual layer of hardware and software components that handles control functions in addition to management actions, as may include provisioning, scaling, replication, etc. The resource manager can utilize dedicated APIs in the interface layer 508, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 508 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 6:
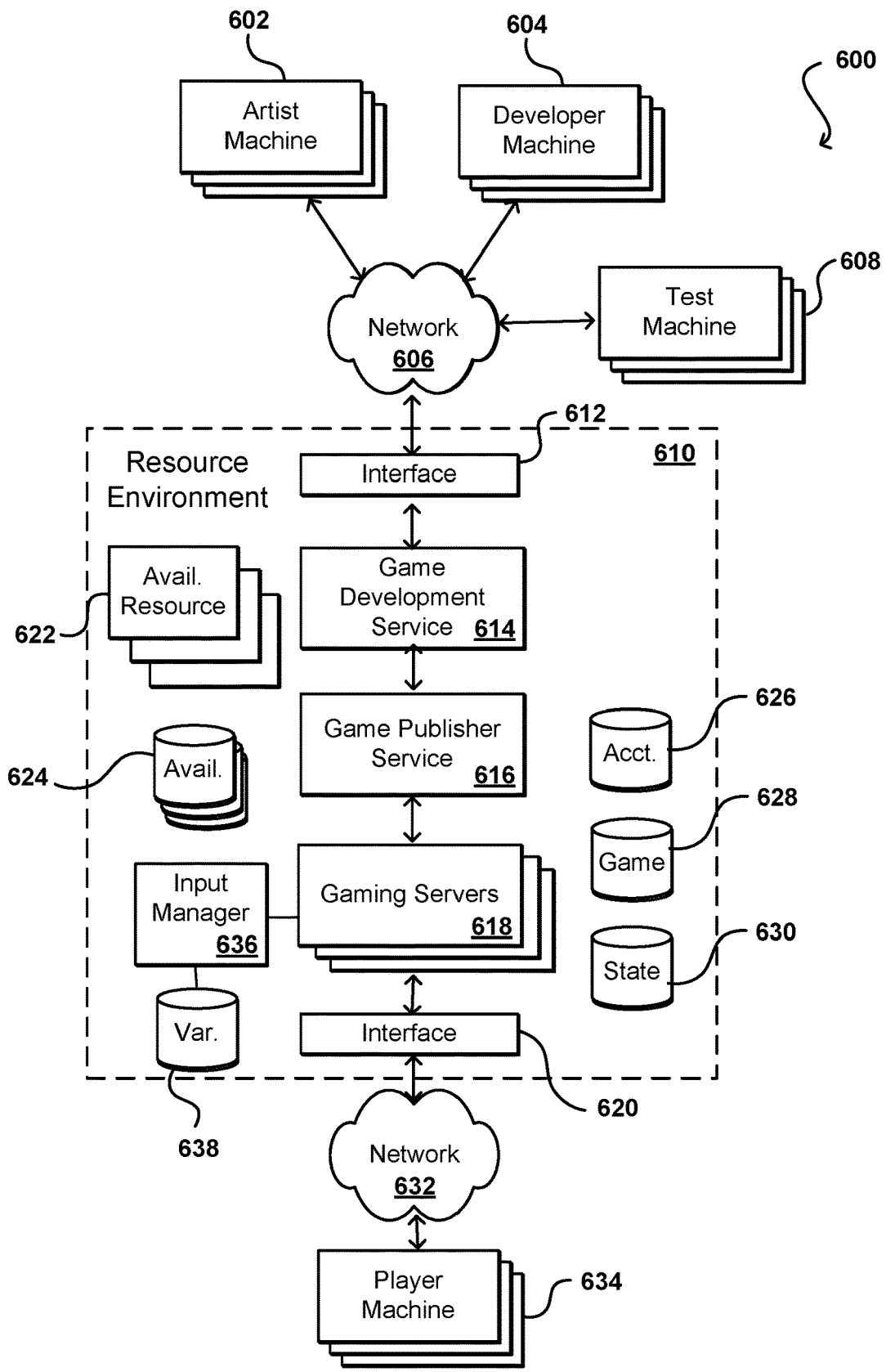
FIG. 6 illustrates an example gaming pipeline that can be used in accordance with various embodiments.

As illustrated in the example system 600 of FIG. 6, at least some of the resources can be used to support platforms and services useful in the development and providing of electronic gaming and three-dimensional graphical content, among other such options. For example, the artist machines 602 and developer machines 604 can collaborate via a game development service 614, which can be provided by a set of resources in the resource environment 610 that are able to scale dynamically as discussed above. It should be understood that artists fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. The development service can also provide communication services such as messaging and content sharing, among other such options. The game development service can store information for a game to at least one game repository 628, where the repositories can include graphics files, code, audio files, and the like. The game development service 614 can also work with an account manager, or at least maintain information in an account data store 626, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like.

Once the game development reaches an appropriate stage in the development cycle or pipeline, as may relate to alpha or beta testing, actual release or updating, etc., the appropriate content can be made accessible to a game publisher service 616. The game publisher service 616 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 604 or otherwise. In some embodiments the game content might be published and made available to one or more test machines 608, which may be associated with the customer, such that the customer can test various builds or versions of the game. In some embodiments feedback provided by the test machines 608 may be provided to the game development service 614, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 618 which can run the game and enable player machines 634 to access the game content over one or more networks 632, which may be different from the network(s) 606 used for game development. This can include, for example, dedicated gaming networks, the Internet, cellular networks, and the like. The player machines 634 can communicate with the appropriate interfaces of an interface layer 620 to obtain the gaming content. In some embodiments the player machines 632 will download the gaming content for execution on the individual machines, and will upload (or otherwise communicate) gaming data, messages, and other information to the gaming servers 618, as well as to other players, social networking sites, or other such recipients. The gaming servers 618 can cause state information for the various instances of the game to be stored to at least one game state repository. This can hold state for the game as a whole or for individual game sessions, among other such options. In some embodiments the game content can be executed by the game servers and streamed in near real time to the player machines 634. In some embodiments there may alternatively be a mix of gaming content executed on the player machines and the gaming servers. Peer to peer connections among the player machines and other communications can be utilized as well in various embodiments.

Such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function. A resource instance can be allocated to run a function in response to a customer request or event, and once the function has completed that instance can either be made available for processing a different event or destroyed, among other such options. In either case, the customer will not be charged for more processing by the instance than was needed to run the function.

As mentioned, the game servers 618 can work with one or more input management components 636 that can determine the variance of input packet timing for various player connections. The components can determine the variance and work with one or more physics engines to determine a distribution or range of possible positions for a player-controlled gameplay element, or a position for the element to be displayed per the position, velocity, and smoothing function. The input manager 636 can work with the gaming servers 618 to adjust the hit volumes or other aspects for the player controlled elements based on the timing of packets received from the respective player machines 634. The input manager 636 in some embodiments can compare the timing data against expected or ideal timing data as may be stored for a game in a variance data store 638, or other such location, for purposes of computing the variance for the player with respect to the current gaming session.

Figure 7:
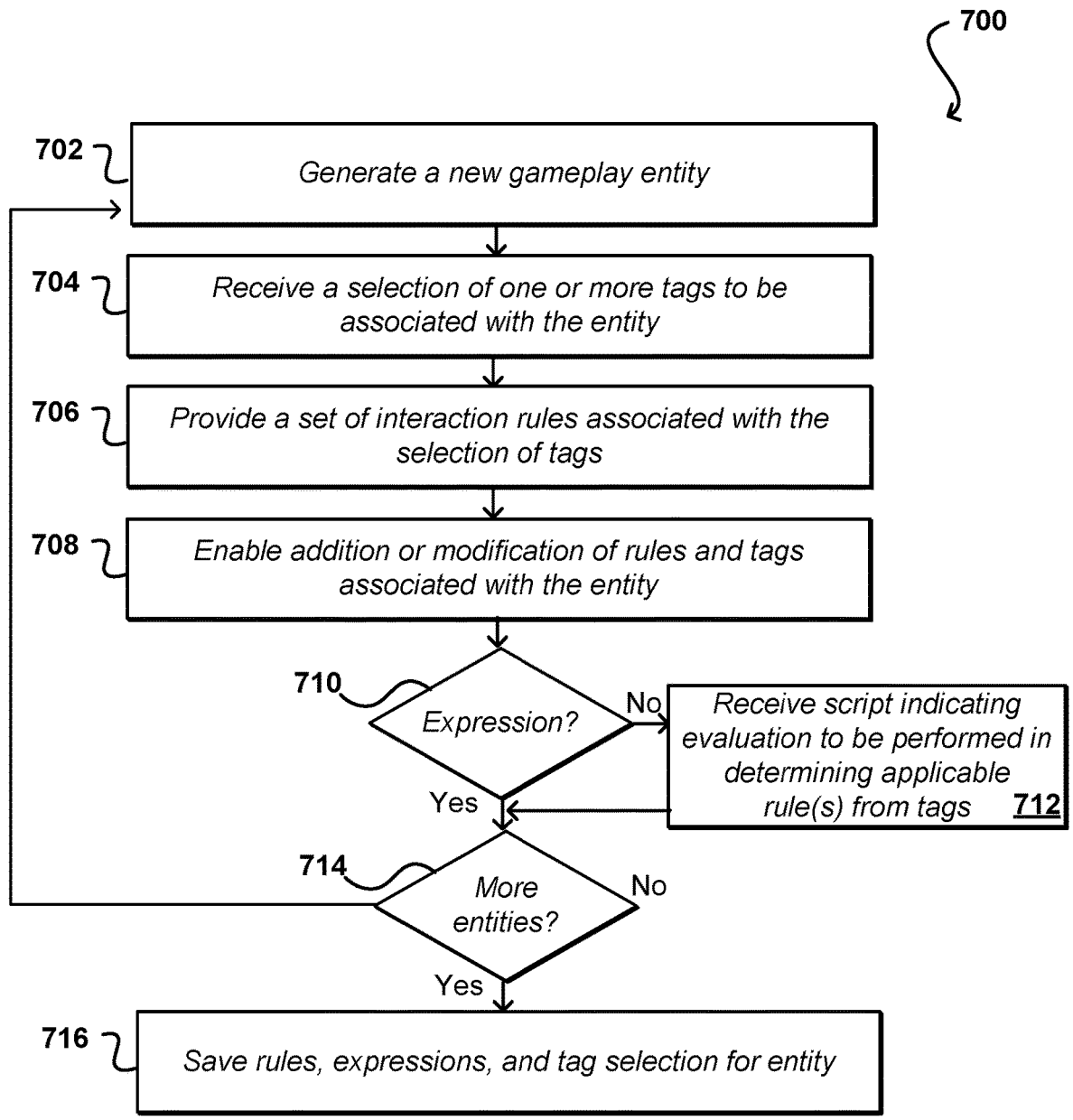
FIG. 7 illustrates an example process for defining interaction behaviors for elements in a virtual environment that can be utilized in accordance with various embodiments.

FIG. 7 illustrates an example process 700 for defining interactions for objects or elements in a virtual environment, such as a video game, that can be utilized in accordance with one embodiment. It should be understood for this and other processes discussed herein that there can be additional, alternative, or fewer steps performed in similar or alternative orders, or in parallel, within the scope of the various embodiments unless otherwise stated. Further, although gaming applications are a primary example utilized herein, it should be understood that other types of applications or content can benefit from advantages of the various embodiments as well, where the users are selected from a pool of potential users for a specific session or purpose, etc. In this example, a new gameplay entity is generated 702 for inclusion in the environment. As mentioned, this can be a player character or a non-player character, a background object, an interactable object, or another such entity, object, or element in the virtual environment. A selection can be received 704 of one or more tags to be associated with the entity. These may be individually selected, selected as a group, or selected by default through indication of a type of the gameplay entity, among other such options. As mentioned, this can also include selecting or loading a set of tags or tag matrix in some embodiments.

A set of interaction rules can be provided 706 that are associated with the selection of tags. For a first entity there may be no existing rules, but for subsequent entities there may be one or more rules that are associated with the tags specified for the element. As mentioned, during development of the rules one or more tags can be specified that indicate when a particular rule should be applied. The interface for developing the application can also enable 708 addition and/or modification of the tags that are applied to the entity, including the generation of new tags, as well as the rules that are associated with those tags. A determination can be made 710 as to whether any custom expressions, script, or logic is to be included with the tags and rules. If so, a script can be received 712 that indicates an evaluation to be performed in determining the applicable rule(s) to be applied for an interaction based on the tags associated with the interacting entities. As discussed, this can include complex expressions involving tags, or groups of tags, that should, or should not, be present for a rule to apply. Once the rules, tags, and expressions are set for an entity, another determination can be made 714 as to whether there are more entities for which interactions are to be defined, and if so the process can continue with the next entity. Once at least some of the interactions are configured, the rules, expressions, and tag selections for the entities can be saved 716 or otherwise stored for reuse for different entities in the same, or a different, game or environment.

Figure 8:
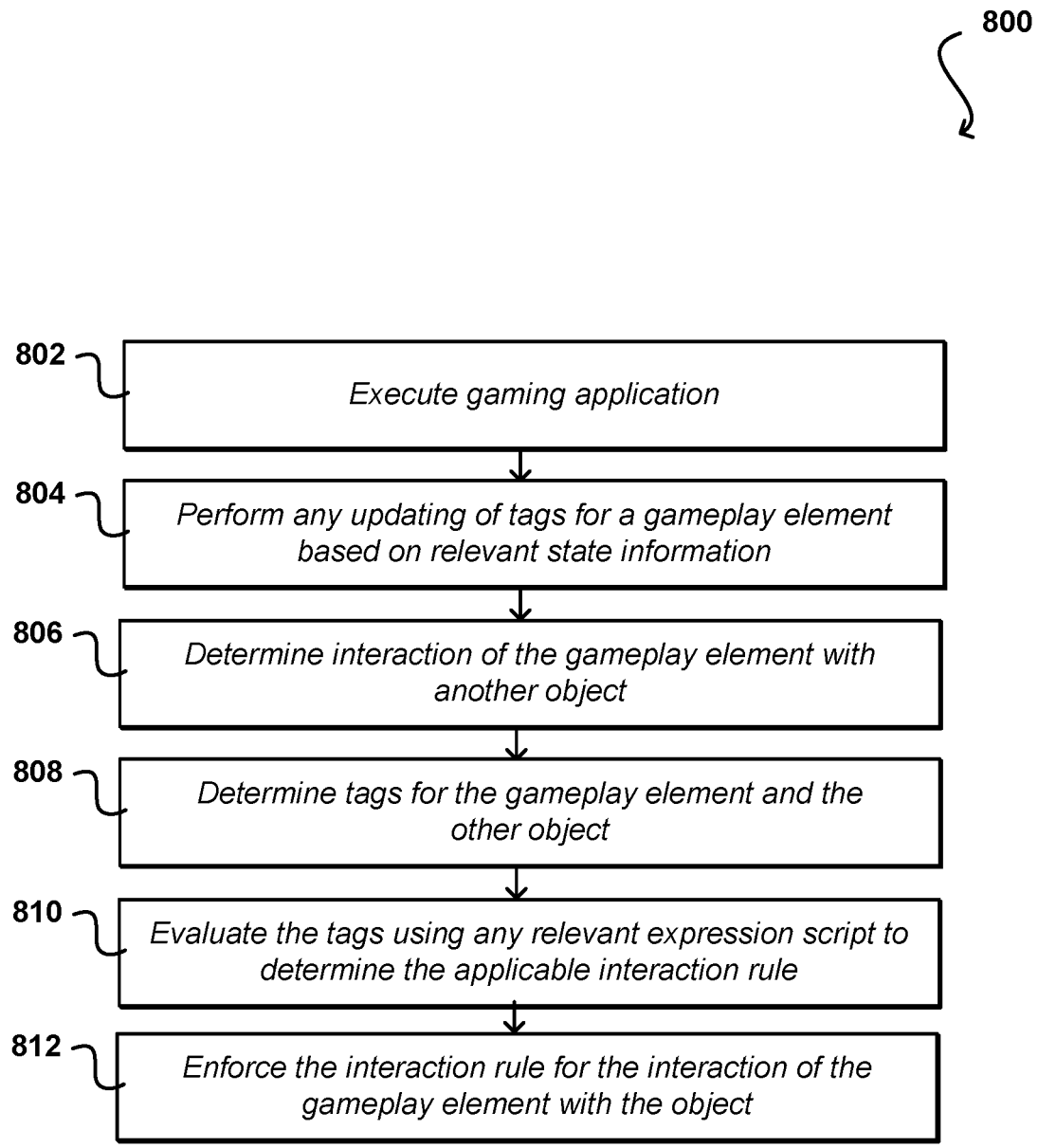
FIG. 8 illustrates an example process for implementing interaction behaviors for elements in a virtual environment that can be utilized accordance with various embodiments.

FIG. 8 illustrates an example process 800 for determining and enforcing interaction rules that can be utilized in accordance with various embodiments. In this example, a gaming application is executed 802 for use by one or more players. Other types of applications can be executed as well as discussed elsewhere herein. During execution of the gaming application, any updating of tags associated with a particular gameplay entity or element can be performed 804 based on relevant state information, such as may relate to the state of the element or the state of the environment, among other such options. The interaction of the gameplay element, such as through proximity in space or other types of interaction, can be determined 806. In order to determine the type of actions to take for the interaction, the tags for the gameplay element and the other object of the interaction can be determined 808. As mentioned, each element or object in the environment can have one or more tags applied that indication which rules apply to interactions involving those elements or objects. The tags can be evaluated 810, including use of any relevant expression script, to determine the applicable interaction rule. As mentioned, there may be some rules that are determined based on the presence of specific tags alone, while there may also be script or logic that indicates various combinations of tags that, when present or not present, indicate that a particular rule should be enforced. Once the appropriate rule is determined, the interaction rule can be enforced 812 for the interaction of the gameplay element with the object. As mentioned, this can include any relevant aspect of the interaction, or action related thereto, as may involve an animation, state change, sound, haptic feedback, etc.

Figure 9:
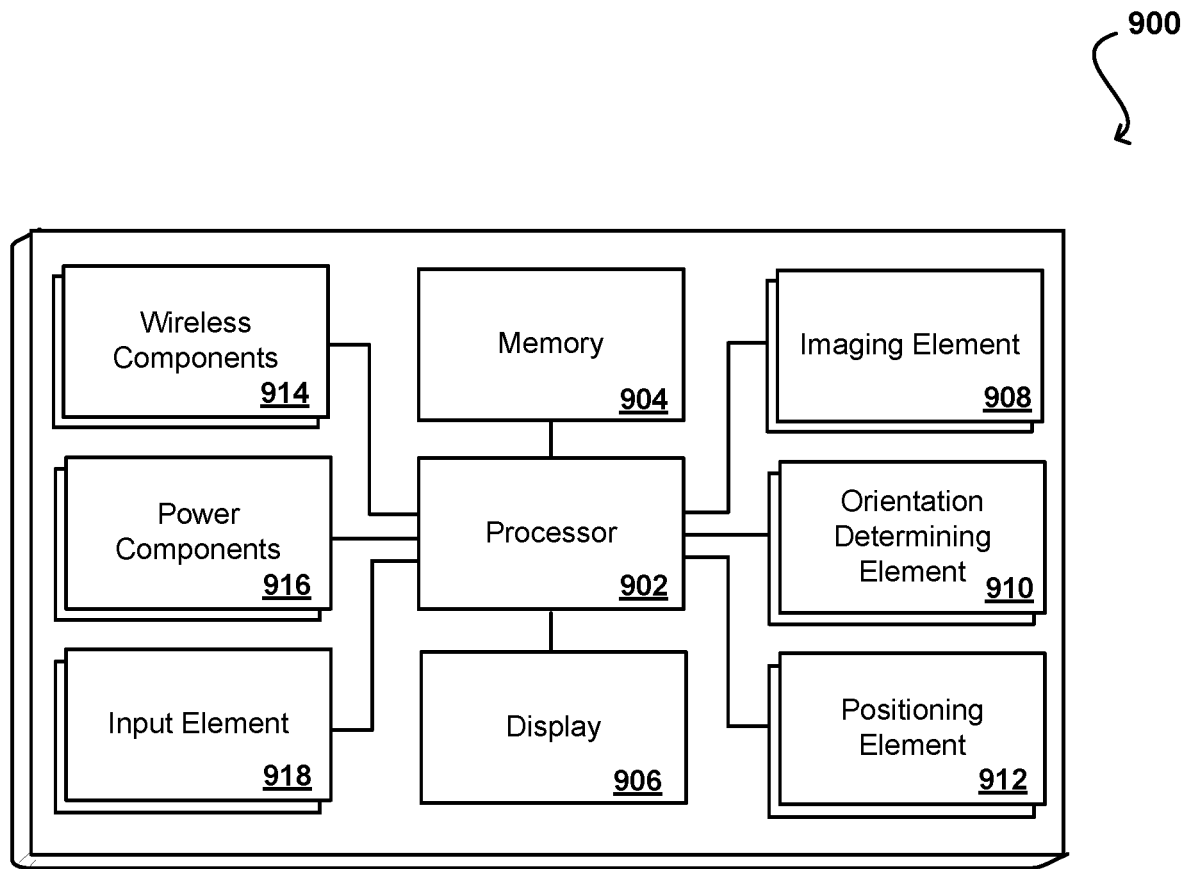
FIG. 9 illustrates example components of a computing device that can be used to implement aspects of the various embodiments.

FIG. 9 illustrates a set of basic components of an electronic computing device 900 that can be utilized to implement aspects of the various embodiments. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices. The device typically will include some type of display screen 906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes at least one orientation determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 918 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   determining, in a computer gaming environment including two or more elements, an interaction of a first element and a second element of the two or more elements in the computer gaming environment, the first element comprising a player character and the second element comprising a virtual object;
   determining a first set of tags applied to the player character and a second set of tags applied to the virtual object, the first set of tags and the second set of tags associated with at least one relationship between the player character and the virtual object in the computer gaming environment, individual tags of the first set of tags and the second set of tags being configured to be associated with at least one of the elements;
   determining an interaction rule, from a set of interaction rules for the computer gaming environment, corresponding to the first set of tags and the second set of tags, based at least in part on the at least one relationship, individual interaction rules of the interaction rules being configured to be associated with one or more combination of tags; and
   enforcing the interaction rule for the interaction, the interaction rule specifying at least one type of action to be performed with respect to the player character and the virtual object in the computer gaming environment.

2. The computer-implemented method of claim 1, wherein the at least one type of action includes at least one of a collision action, an animation, a state change, a sound generation, or a physics-based behavior of at least the player character in the computer gaming environment.

3. The computer-implemented method of claim 1, further comprising:
   evaluating the first set of tags and the second set of tags using an expression script for the interaction rule, the expression script indicating logic to use to evaluate the tags for applicability of the interaction rule.

4. The computer-implemented method of claim 1, further comprising:
   determining a change in state of the player character; and
   dynamically causing a new set of tags to be applied to the player character, the new set of tags causing a new interaction rule to be enforced for the player character for subsequent interactions in the computer gaming environment.

5. The computer-implemented method of claim 1, further comprising:
   storing a set of tags, including the first set and the second set, and the set of rules; and
   enabling the set of tags and the set of rules to be applied to other objects in the computer gaming environment or a separate computer gaming environment.

6. A computer-implemented method, comprising:
   determining, in a computer gaming environment including two or more elements, an event involving an element of the one or more elements in the virtual environment, wherein the element is an object;
   determining one or more object tags applied to the object, the one or more tags being associated with at least one relationship between the object and one or more elements in the virtual environment, interaction rules of the one or more object tags being configured to be associated with the one or more elements;
   determining an event rule corresponding to the one or more object tags applied to the object, based at least in part on the at least one relationship, individual event rules being configured to be associated with one or more combination of tags; and
   causing the event rule to be enforced for the object with respect to the one or more elements in the virtual environment.

7. The computer-implemented method of claim 6, further comprising:
   determining an additional tag associated with at least one other object for the event, wherein the event rule is further determined using the additional tag.

8. The computer-implemented method of claim 7, further comprising:
   evaluating the one or more object tags and the additional tag using an expression script for the event rule, the expression script indicating logic to use to evaluate the tags for applicability of the event rule.

9. The computer-implemented method of claim 6, further comprising:
dynamically updating a selection of the one or more object tags applied to the object based at least in part upon a change in state of the object, wherein a different event rule will be enforced for the object for subsequent events in the virtual environment.

10. The computer-implemented method of claim 6, further comprising:
applying the one or more object tags to the object; and
associating the event rule with the one or more object tags.

11. The computer-implemented method of claim 6, further comprising:
storing the one or more object tags and the event rule associated with the object; and
enabling the one or more object tags and the event rule to be applied to at least one other object in the virtual environment or a separate virtual environment.

12. The computer-implemented method of claim 6, wherein the event rule causes at one type of action to be performed, the at least one type of action including at least one of a collision action, an animation, a state change, a sound generation, or a physics-based behavior of at least the object in the virtual environment.

13. The computer-implemented method of claim 6, further comprising:
determining an event based on a proximity of a first boundary for the object and a second boundary for a second object in the virtual environment.

14. The computer-implemented method of claim 6, further comprising:
storing a tag matrix for the event rule, the tag matrix indicating at least which tags trigger the event rule to be enforced for an event involving an associated object in the virtual environment.

15. The computer-implemented method of claim 6, further comprising:
providing a set of object tags from which the one or more object tags is able to be selected; and
providing a set of configured event rules from which the event rule is able to be determined for the object.

16. A system, comprising:
at least one processor; and
memory including instructions that, when executed by the at least one processor, cause the system to:
determine, in a computer gaming environment including two or more elements, an interaction involving an element of the one or more elements in the virtual environment, the element comprising an object;
determine one or more object tags applied to the object, the one or more tags being associated with at least one relationship between the object and one or more elements in the virtual environment, individual object tags of the one or more object tags configured to be associated with the one or more elements;
determine an interaction rule corresponding to the one or more object tags applied to the object, based at least in part on the at least one relationship, individual event rules being configured to be associated with one or more combination of tags; and
cause the interaction rule to be enforced for the object with respect to the one or more elements in the virtual environment.

17. The system of claim 16, wherein the instructions when executed further cause the system to:
determine an additional tag associated with at least one other object for the interaction, wherein the interaction rule is further determined using the additional tag.

18. The system of claim 16, wherein the instructions when executed further cause the system to:
evaluate the one or more object tags and the additional tag using an expression script for the interaction rule, the expression script indicating logic to use to evaluate the tags for applicability of the interaction rule.

19. The system of claim 16, wherein the instructions when executed further cause the system to:
dynamically update a selection of the one or more object tags applied to the object based at least in part upon a change in state of the object, wherein a different interaction rule will be enforced for the object for subsequent interactions in the virtual environment.

20. The system of claim 16, wherein the instructions when executed further cause the system to:
store the one or more object tags and the interaction rule associated with the object; and
enable the one or more object tags and the interaction rule to be applied to at least one other object in the virtual environment or a separate virtual environment.

* * * * *